May 17, 1932.  B. JONES  1,858,399
FLOW METER CONSTRUCTION
Filed May 21, 1928
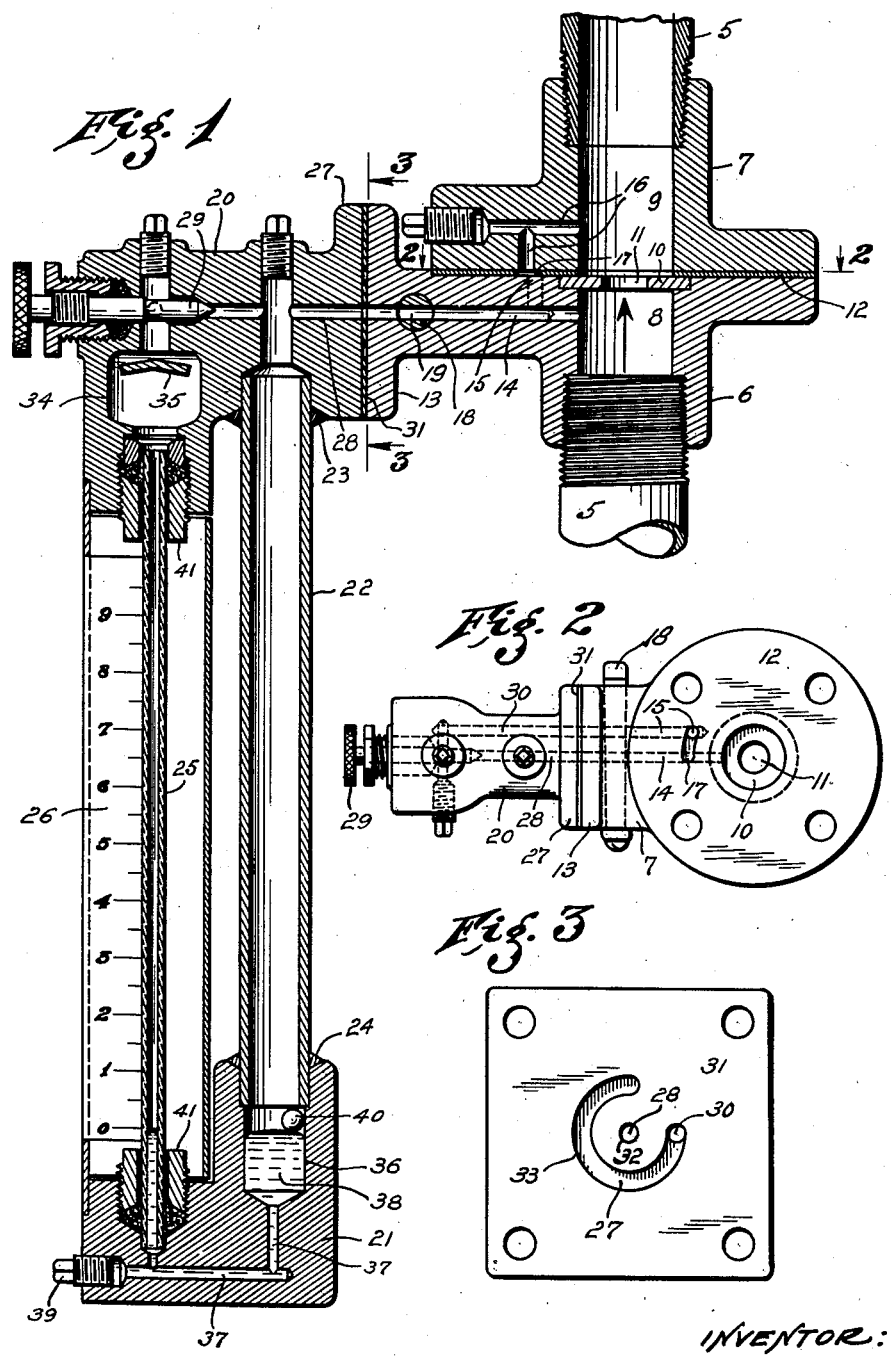
INVENTOR:
Barton Jones,
By Arthur J. Farnsworth
ATTORNEY Patented May 17, 1932

1,858,399

UNITED STATES PATENT OFFICE

BARTON JONES, OF LOS ANGELES, CALIFORNIA

FLOW-METER CONSTRUCTION

Application filed May 21, 1928. Serial No. 279,399.

In this specification, and the accompanying drawings, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to flow-meter construction, and particularly to instruments for this purpose that employ mercury, or other liquid columns, to indicate pressure differences. Its principal objects include; first, the provision of improved means for preventing the loss of indicating liquid when sudden great changes of differential pressure occur in the use of such instruments; second, the furnishing of better means than have been available hitherto, for mounting instruments of this type in a plurality of angular positions; third, the supplying of more satisfactory facilities for adjusting such instruments and testing their accuracy of indications; and, fourth, the accomplishing of the above purposes in a simple and relatively inexpensive construction.

My objects are attained in the manner illustrated in the accompanying drawings, showing a typical form of my invention and in which—

Figure 1 is an elevation of my improved construction in central vertical section;

Figure 2 is a plan view of the same, taken on the line 2—2 of Figure 1 and drawn to a reduced scale; and Figure 3 is an enlarged elevation of a typical form of gasket that I employ, as it would appear if a section were taken on the line 3—3 of Figure 1.

Similar reference numerals refer to similar parts throughout the several views.

In the drawings a vertical pipe line upon which flow measurements are to be taken is shown at 5. The line is divided, and a pair of faced companion fittings 6 and 7 are inserted therein, substantially in the manner indicated. These fittings respectively have bores 8 and 9 therethrough, of the same size and substituted for the original flow passage of the pipe line. The lower fitting has a shallow counterbore in which reposes an orifice plate 10 which is perforated by a central measuring orifice 11, the thickness of the orifice plate being the same as the depth of the counterbore. A gasket 12 is interposed between the horizontal faces of fittings 6 and 7, overlapping the orifice plate, and completes the joint between these fittings.

Fitting 6 is provided with a lateral flange 13 which is faced in a vertical plane, and a small pressure passage 14 leads from bore 8 to the center of the vertical face of this flange. A second small pressure passage 15 leads from the face of flange 13 into the body of the fitting, and then upward to its horizontal face.

Fitting 7 has a small pressure passage 16 leading from its bore 9 downwardly to its horizontal face, and gasket 12 is provided with an arcuate slot 17 which forms, in cooperation with the horizontal faces of fittings 6 and 7, a pressure passage that connects passages 15 and 16.

Fitting 6 is provided with a plug cock 18, intercepting pressure passages 14 and 15, and the cock is provided with transverse bores, one of which is shown at 19, whereby these small passages may be opened or closed at will.

The indicating portion of my invention is shown at the left hand sides of Figures 1 and 2. It comprises a fitting 20 at the top, and a fitting 21 at the bottom. These are permanently joined by a metal tube 22, as by weldings at 23 and 24. They are also connected by a replaceable glass indicating tube 25, and by a scale plate 26.

Fitting 20 is provided with a vertical faced flange 27. A small pressure passage 28, leads from the center of the face of this flange to tube 22 and also, when so desired, to tube 25 by the opening a needle valve 29. A second pressure passage 30 leads from the face of flange 27 to the indicating tube 25. Passages 28 and 30 are the same distance apart as passages 14 and 15.

Flanges 13 and 27 are joined by means of the interposed gasket 31; the latter having a central opening 32 and an arcuate slot 33 therethrough, so that passage 14 may communicate with passage 28, and passage 15 with passage 30, when the flanges are assembled in any one of a plurality of angular relations.

Fitting 20 is provided with a surge chamber 34 of relatively large diameter, immediately above indicating glass 25; and with a baffle plate 35 having a concave lower face, opposite the upper end of the glass and spaced therefrom.

Lower fitting 21 has a well 36, of substantial size, at the lower end of tube 22 and extending below the 0 of scale 26. It also has a passage 37 of small size, connecting the well and the lower end of glass 25. A body of mercury 38 fills the lower end of tube 25, passage 37, and part of well 36. The quantity of mercury is such that when there is no difference of pressure in tubes 22 and 25, the upper meniscus in each tube will stand at the level of the 0 of scale 26. A screw plug 39 is provided for making fine adjustments of the mercury level, by varying the volume of the space that communicates with passage 37. A small steel ball 40 floats upon the mercury in well 36 and is of such diameter that, if the mercury should suddenly be forced out of the well by excess pressure in tube 22, it will follow the mercury down and seat itself upon the upper end of passage 37.

Packing glands 41, of any usual and suitable type, provide means for ready replacement of indicating tube 25 and making it pressure tight within the instrument.

After my instrument has been properly positioned for the measurement of differential pressures, in the manner described and indicated in the drawing, it is operated in the following manner:—

After first closing cock 18, the needle valve 29 is opened to equalize the pressure in tubes 22 and 25. The level of the mercury should then show opposite the 0 of scale 26. If it does not stand at this level, the plug 39 is turned in the proper direction to vary the space communicating with passage 37, until the mercury stands at the 0 level. Needle valve 29 is then closed tight, and cock 18 is opened. The mercury will then immediately rise in tube 25 to a height corresponding to the difference in pressures in bores 8 and 9 on the respective sides of the measuring orifice. If there should be a sudden and violent surge of pressure differential at any time, the baffle plate 35 will prevent the mercury from being jetted out of the instrument. A continued excess pressure is prevented from forcing the mercury out of the instrument by means of the seating of ball 40 that will occur in such an event. It will therefore be obvious that my flow-meter construction is well adapted for use where sudden and violent changes of differential pressure are likely to occur; and that neither the instrument or other apparatus associated therewith will be subjected to injury by loss of mercury from such causes.

I particularly desire to point out another, and very important, function of steel ball 40. Without the ball, a sudden and sustained great change in the pressure differential would force all of the mercury into surge chamber 34. The upward movement of the mercury in tube 25 would not only tend to accelerate, under well known laws, as soon as it reached the upper end of the tube; but the acceleration under such conditions would be greatly augmented by the fact that the opposing head of the mercury column would become less and less as the mercury left the tube and flowed into the surge chamber. The mercury leaving the tube last would have a very high velocity, and impinge upon baffle plate 35 with great force. It would thus be broken up into fine particles and some of these might be drawn around the edges of the baffle and escape.

The same result, of breaking up the body of mercury into fine particles, and losing a portion in this way, might follow a violent forcing of steam or other fluid through the mercury in the surge chamber.

The use of the steel ball prevents both of the occurrences just described. When the ball is used, the tube 25 can never be emptied of mercury by pressure in tube 22, and no steam or other fluid can be forced upwardly through the mercury.

Having thus fully described my invention, I claim:

1. In combination; a differential pressure gauge having separate passages leading from adjacent points of its exterior surface; a companion device having separate passages leading from different sources of pressure to similarly positioned points of its exterior surface; and a gasket of substantial thickness interposed between said surfaces and engaging them on its opposite sides; said gasket having a hole therethrough opposite one of the passages of each of said devices, and a concentric arcuate slot therethrough opposite the other of said passages.

2. A construction as set forth in claim 1 wherein said devices are adapted for being connected together with said surfaces in a plurality of rotative relations about an axis that is perpendicular to the surfaces, and that is concentric with said hole in the gasket.

3. In combination; a differential pressure gauge having separate passages leading from adjacent points of its exterior surface; a companion device that is suitable for insertion in a pipe line, and that has an intermediately obstructed bore therethrough whereby it is adapted for producing differential pressures varying with the rate of flow of fluid in said pipe line, there being separate passages leading from said bore on opposite sides of said obstruction to points on the exterior surface of said companion device that are spaced similarly to the corresponding said points of the gauge; and a gasket of substantial thickness interposed between said surfaces and engaging them on its opposite sides; said gasket having a hole therethrough opposite one of the passages of each of said devices, and a concentric arcuate slot therethrough opposite the other of said passages.

BARTON JONES.